Sept. 16, 1952     K. C. JOHNSON     2,610,535
FEED CONTROL MECHANISM FOR LATHES
Filed Dec. 29, 1949     2 SHEETS—SHEET 1

INVENTOR.
Kenneth C. Johnson
BY Nathaniel Frucht
ATTORNEY

Sept. 16, 1952 K. C. JOHNSON 2,610,535
FEED CONTROL MECHANISM FOR LATHES
Filed Dec. 29, 1949 2 SHEETS—SHEET 2

INVENTOR.
Kenneth C. Johnson
BY Nathaniel Frucht
ATTORNEY

Patented Sept. 16, 1952

2,610,535

UNITED STATES PATENT OFFICE 2,610,535

FEED CONTROL MECHANISM FOR LATHES

Kenneth C. Johnson, Riverside, R. I.

Application December 29, 1949, Serial No. 135,774

4 Claims. (Cl. 82—23)

The present invention relates to lathe control mechanism, and has particular reference to a novel arrangement for thread cutting.

The principal object of the invention is to provide a control which starts and stops longitudinal feed of the cutting tool and simultaneously cross feeds the tool inwardly and outwardly of the cut.

Another object of this invention is to facilitate the cutting screw threads on a screw cutting lathe by connecting the cross feed and the longitudinal feed to operate simultaneously.

Another object is to provide a release mechanism which disengages the half nut from the lead screw to stop inward motion of the cross-slide and simultaneously rotates the cross feed handle to back the cutting tool out of the cut.

Another object of the invention is to eliminate setting stops for the cross slide for proper inward or outward setting of the cutting tool at the beginning or end of each successive cut.

An additional object of the invention is to facilitate cutting a screw thread to the desired length.

An additional object of the invention is to provide means whereby the cross feed mechanism can be reversed so that either internal or external threads can be cut.

A further object of the invention is to provide a control which prevents damage to the tool and the chuck or other work holding mechanism by eliminating over-recessing.

Another object is to regulate the travel of the cross slide when cutting internal threads so that the cutting tool holder will not strike the opposite side of the hole when backing out of the cut.

An additional object of this invention is to mount the novel mechanism on the lathe as an integral part of the machine.

Another object of the invention is to provide a single control knob for engaging or disengaging the device by sliding one control knob into position.

With the above and other objects and advantageous features in view, the invention consists of a novel arrangement of parts more fully disclosed in the detailed description following, in conjunction with the accompanying drawings, and more specifically defined in the claims appended thereto.

Figure 1:
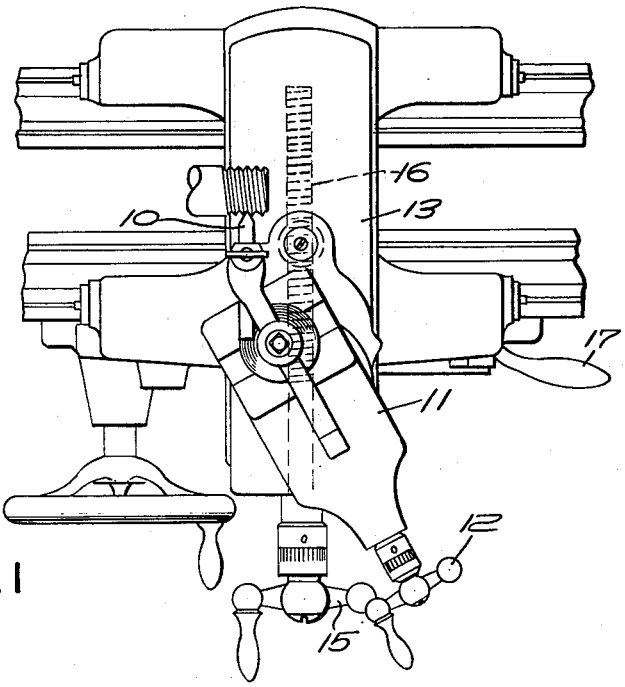
Fig. 1 is a top plan view of a lathe carriage and its associated parts.
Figure 2:
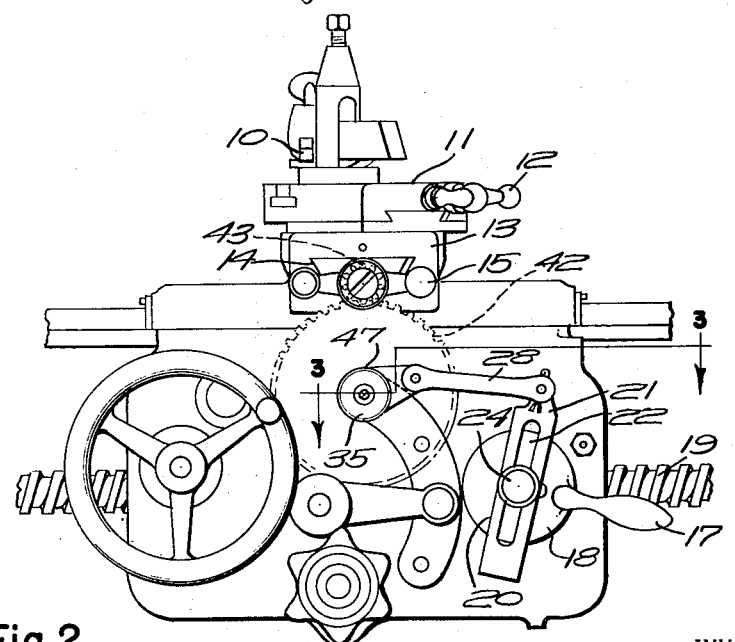
Fig. 2 is a front elevation of Fig. 1.

It has been found desirable to provide a simple and effective control for a lathe whereby screw thread cutting is facilitated. To this end, I have devised a mechanism which links the longitudinal screw feed and the cross slide feed parts together so that the shifting of one lever will disengage the half nut parts from the lead screw and rotate the cross slide screw shaft to bring the cutting tool away from the cutting position. A single movement of one control lever by the operator halts the cutting operation, thus permitting close visual regulation of the length of thread, and a reverse movement of the control lever reengages the half nut parts and resets the cross slide to the previous cutting position while succeeding cuts are cut deeper by advancement of the compound rest as in conventional thread cutting.

Referring to the drawings, the cutting tool 10 is mounted upon the compound rest 11 in a conventional manner for manually shifting by the standard handle 12. This assembly in turn is mounted upon the cross slide 13, which slides upon the dovetail 14 at right angles to the axis of the work being turned, and is manually shiftable by a standard handle 15 through the cross slide screw 16 and the cross slide screw nut, indicated in dotted lines, fastened in the cross slide 13.

Longitudinal feed of the cutting tool 10 is obtained by turning a half nut lever 17 to rotate a half nut cam 18, to thereupon move the upper and lower half nuts (not shown) into engagement with the longitudinal feed screw 19 in the usual manner. I interlock the cross feed mechanism with the longitudinal feed mechanism so that movement of the half nut lever 17 for engaging or disengaging the longitudinal screw feed also shifts the cross slide 13 inwardly into tool cutting position.

I preferably accomplish this interlocking by cutting a diametrical slot 20 in the half nut cam 18 in which an adjustable slide lever 21 is mounted, the slide lever 21 having a longitudinal elongated hole 22 cooperating with a reduced bearing section 23 of a mounting screw 24 which is threadedly secured into the lathe apron. The slide lever may be adjusted in the slot 20 for a purpose hereinafter explained.

The upper end 25 of the slide lever 21 is extended to be received between two spaced ears 26, 27 at one end of a link 28, the ears 26, 27 and the upper end 25 having aligned openings and being pivotally secured together by a pivot pin 29. The other end 30 of the link 28 has spaced ears 31, 32 for pivotal securing to a lateral extension 33 of the inner portion 34 of a dog clutch 35, by means of a pivot pin 36 which extends through aligned openings in the ears 31, 32 and the extension 33.

The clutch 35 is rotatably mounted on an intermediate section 37 and an outer section 38 of a stepped shaft 39 which is rotatably mounted in the lathe apron and which has an inner section 40 of smaller diameter. The inner shaft section 40 carries a standard cross feed gear pinion 41 and a cross feed gear 42, see Fig. 3, which are keyed thereto. The cross feed gear pinion 41 and the cross feed gear 42 are in mesh with the cross slide screw pinion 43 and are free to rotate when the lathe is set up for threading, its purpose being to form a gear train for the power cross feed.

The outer portion 44 of the clutch 35 is castellated to provide teeth 45 for meshing with cooperating teeth 46 of the inner portion 34, and is slidably keyed to the outer section 38 of the stepped shaft 39, the outer portion 44 being provided with an enlarged knurled section 47. The outer shaft section 38 has a transverse recess 48 in which a spring pressed friction ball 49 is positioned, and the outer clutch portion 44 has two longitudinally spaced openings 50, 51 for selectively receiving the ball 49 to releasably retain the outer portion 44 with its teeth 45 disengaged or engaged with the teeth 46.

Figure 3:
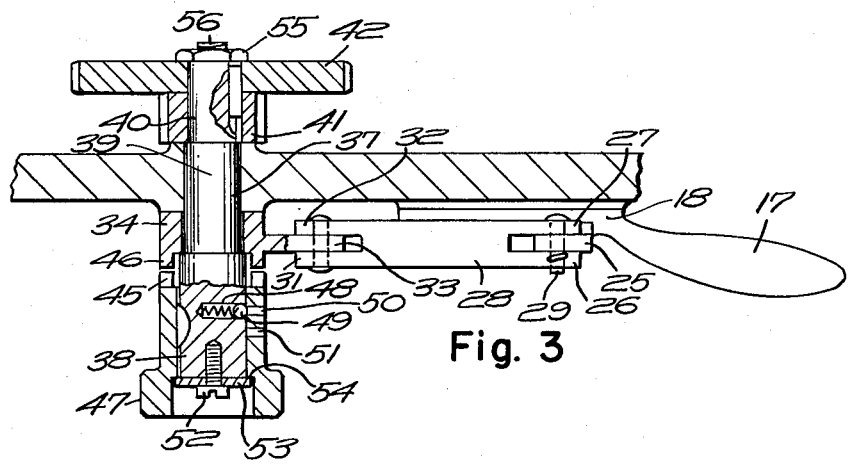
Fig. 3 is an enlarged sectional detail of the novel control on the line 3—3 of Fig. 2 partly broken away.
Figure 4:
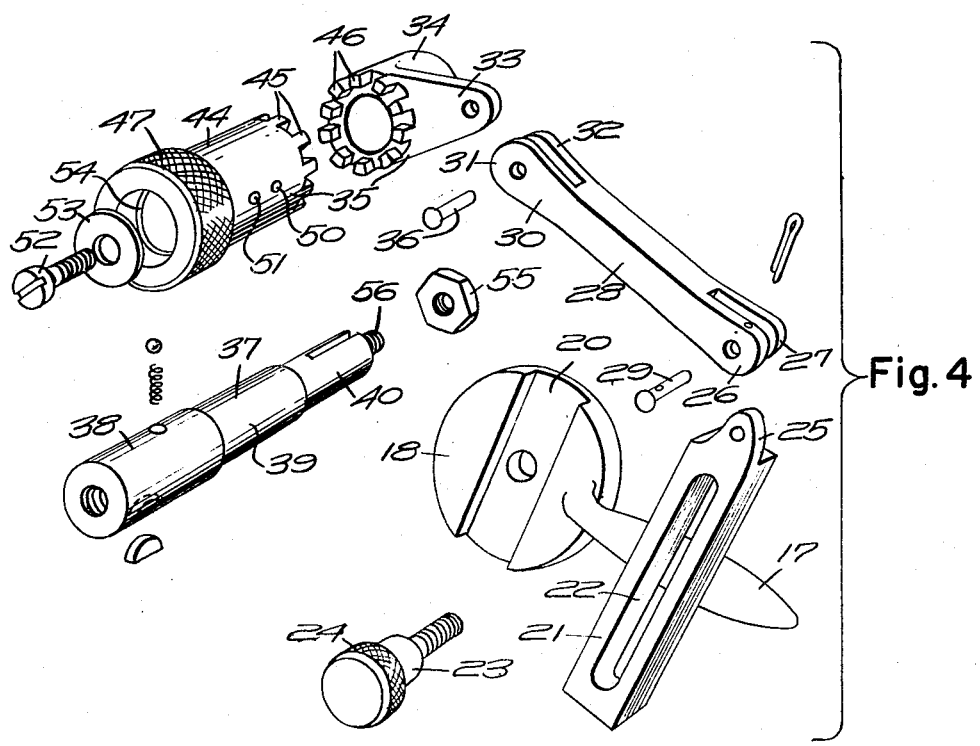
Fig. 4 is an exploded view of the parts of Fig. 3.

A large headed screw 52 and a washer 53, see Fig. 3, are mounted on the outer end 38 of the stepped shaft 39 to engage an inner shoulder 54 of the outer portion 44 to lock it against removal, and a nut 55 is secured to the inner reduced threaded end 56 of the stepped shaft 39 to lock the cross feed gear 42 and the cross feed gear pinion 41 in place.

The operation of the novel control may now be explained. When the tool has been set, and the cross slide 13 brought to an approximate cutting position manually, the outer clutch portion 44 is shifted to engaged position, thus connecting the cross feed gearing to the half nut cam 18 through the stepped shaft 39, outer portion 44, inner portion 34, line 28 and adjustable slide lever 21. A rotation of the half nut cam 18 by means of the half nut lever 17 to disengage the half nut from the lead screw 19 simultaneously rotates the cross feed gearing and moves the cross slide 13 to back the tool out of the cut; when the half nut lever 17 is moved to engage the lead screw, the cross feed gearing is also moved inwardly to move the cross slide to the previously set position. Further adjustment of the cutting tool is effected by advancing the compound rest 11 through the standard handle 12.

The extent of automatic movement of the cross slide 13 can be readily regulated by shifting the adjustable slide lever 21 in the slot 20 and locking it in the desired position by the screw 24. This eliminates the need for cross slide stops as the cross slide 13 stops at the same position each time the mechanism is actuated. The adjustable feature of the cross slide 13 is particularly advantageous in cutting internal threads as the travel of the cross slide 13 can be regulated so that the cutting tool holder will not strike the opposite side of the hole when backing out of the cut.

Further, the control mechanism can be readily disengaged by means of the outer clutch portion 44 for facing work or for normal turning, and can be easily reversed by setting the inner clutch portion 34 in a downward position to rotate the cross feed gearing in the opposite direction for the same previous motion of the half nut cam 18, thus bringing the cross slide 13 outwardly as the half nuts are engaged. The cooperating screw feed and cross feed movements are particularly suitable for starting a thread next to a shoulder, by reversing the lathe and cutting from the rear or inverting the tool, as the cross feed begins as the half nuts are engaged.

Although I have disclosed a specific embodiment of the invention, it is obvious that changes in the arrangement, number and operation of the parts may be made to adapt the control mechanism for different sizes and types of screw cutting lathes, without departing from the spirit or the scope of the invention as defined in the claims appended hereto.

I claim:

1. A control mechanism for a lathe having a tool carrier, a longitudinal feed screw, releasable lock means operatively connecting the tool carrier and the longitudinal feed screw, and a manually settable cross slide on said tool carrier, comprising a cam movable to lock and unlock the releasable lock mechanism, and mechanism connecting the cam to the cross slide for simultaneously moving the cross slide inwardly on locking movement and outwardly on unlocking movement, said cross slide having a cross feed screw, and said mechanism including gearing for rotating said screw, linkage connecting said cam to said gearing, and a manually settable clutch for locking the cross slide feed screw in adjusted relation to the mechanism connecting the cam and the cross slide.

2. A control mechanism for a lathe having a tool carrier, a longitudinal feed screw, releasable lock means operatively connecting the tool carrier and the longitudinal feed screw, and a manually settable cross slide on said tool carrier, comprising a cam movable to lock and unlock the releasable lock mechanism, and mechanism connecting the cam to the cross slide for simultaneously moving the cross slide inwardly on locking movement and outwardly on unlocking movement, said cross slide having a cross feed screw, and said mechanism including gearing for rotating said screw and adjustable links, the length of one of said links being adjustable to change the extent of inward and outward travel of the cross slide.

3. A control mechanism for a lathe having a tool carrier, a longitudinal feed screw, releasable lock means operatively connecting the tool carrier and the longitudinal feed screw, and a manually settable cross slide on said tool carrier, comprising a cam movable to lock and unlock the releasable lock mechanism, and mechanism connecting the cam to the cross slide for simultaneously moving the cross slide inwardly on locking movement and outwardly on unlocking movement, said mechanism including a slot in said cam, a slide element in said slot, gearing for the cross slide including a cross feed screw and a cross feed pinion and linkage operatively connecting the slide element to the cross feed pinion.

4. A control mechanism for a lathe having a tool carrier, a longitudinal feed screw, releasable lock means operatively connecting the tool carrier and the longitudinal feed screw, and a manually settable cross slide on said tool carrier, comprising a cam movable to lock and unlock the releasable lock mechanism, and mechanism connecting the cam to the cross slide for simultaneously moving the cross slide inwardly on locking movement and outwardly on unlocking movement, said mechanism including a slot in said cam, a slide element adjustably secured in said slot, gearing for the cross slide including a cross feed screw and a cross feed pinion and linkage operatively connecting the slide element to the cross feed pinion.

KENNETH C. JOHNSON.

REFERENCES CITED

The following references are of record in the file of this patent:

UNITED STATES PATENTS

| Number | Name | Date |
| --- | --- | --- |
| 143,898 | Gleason | Oct. 21, 1873 |
| 319,943 | Wohlenberg | June 9, 1885 |
| 392,337 | Holly | Nov. 6, 1888 |

FOREIGN PATENTS

| Number | Country | Date |
| --- | --- | --- |
| 1,410 | Great Britain | June 9, 1853 |